United States Patent
Araki et al.

(10) Patent No.: US 10,385,853 B2
(45) Date of Patent: Aug. 20, 2019

(54) ROTARY MACHINE ABNORMALITY DETECTION DEVICE AND METHOD THEREOF AND ROTARY MACHINE

(71) Applicant: Kobe Steel, Ltd., Kobe-shi (JP)

(72) Inventors: Kaname Araki, Kobe (JP); Eiji Takahashi, Kobe (JP); Shugo Takaki, Takasago (JP); Masato Hayashi, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 266 days.

(21) Appl. No.: 15/345,980

(22) Filed: Nov. 8, 2016

(65) Prior Publication Data

US 2017/0205316 A1 Jul. 20, 2017

(30) Foreign Application Priority Data

Jan. 18, 2016 (JP) .................................. 2016-007115

(51) Int. Cl.
*F04C 28/28* (2006.01)
*G01H 1/00* (2006.01)
*F04C 18/16* (2006.01)

(52) U.S. Cl.
CPC .............. *F04C 28/28* (2013.01); *F04C 18/16* (2013.01); *G01H 1/003* (2013.01);
(Continued)

(58) Field of Classification Search
CPC ....... G01M 99/005; F04C 18/16; F04C 28/28; G01H 1/003
See application file for complete search history.

(56) References Cited

U.S. PATENT DOCUMENTS

| 3,758,758 A * | 9/1973 | Games .................. G01H 1/003 324/76.13 |
| 2005/0149290 A1* | 7/2005 | Barkhoudarian ....... F16H 61/12 702/182 |

(Continued)

FOREIGN PATENT DOCUMENTS

| JP | 5-231361 | 9/1993 |
| JP | 9-133577 | 5/1997 |

OTHER PUBLICATIONS

Ebrahimi, 2012, Fault diagnosis of Spur gear using vibration analysis, Journal of American Science, 2012;8(1), pp. 133-138.*

(Continued)

*Primary Examiner* — Stephanie E Bloss
*Assistant Examiner* — Lisa E Peters
(74) *Attorney, Agent, or Firm* — Oblon, McClelland, Maier & Neustadt, L.L.P.

(57) ABSTRACT

A rotary machine abnormality detection device capable of determining abnormality with higher accuracy, a method thereof, and a rotary machine provided therewith. A rotary machine abnormality detection device detects abnormality in a rotary machine M having at least first and second rotating bodies using a specific feature amount based on a frequency spectrum of measurement data of vibration. The device obtains, from the frequency spectrum, a fundamental wave component F1 of a fundamental wave lobe mesh frequency f1 and n-th harmonic wave components Fn of n-th harmonic wave lobe mesh frequencies fn up to XAB, and obtains the specific feature amount based on these components. The f1 is obtained by dividing a rotational frequency by a teeth number of the first rotating body and the XAB represents the least common multiple of the teeth numbers of the two rotating bodies.

10 Claims, 10 Drawing Sheets

(52) U.S. Cl.
CPC ...... *F04C 2270/12* (2013.01); *F04C 2270/80* (2013.01); *F04C 2270/86* (2013.01)

(56) References Cited

U.S. PATENT DOCUMENTS

| | | | | |
|---|---|---|---|---|
| 2007/0260656 | A1* | 11/2007 | Wiig | G01H 1/003 708/200 |
| 2009/0093975 | A1* | 4/2009 | Judd | G01H 13/00 702/34 |
| 2015/0075310 | A1* | 3/2015 | Lunin | F16H 49/001 74/412 R |
| 2015/0233792 | A1* | 8/2015 | Gao | G01M 99/005 702/35 |

OTHER PUBLICATIONS

Gerber et al, 2013, Identification of harmonics and sidebands in a finite set of spectral components, HAL Archives-Ouvertes, MFPT 2013, pp. 1-9.*

* cited by examiner

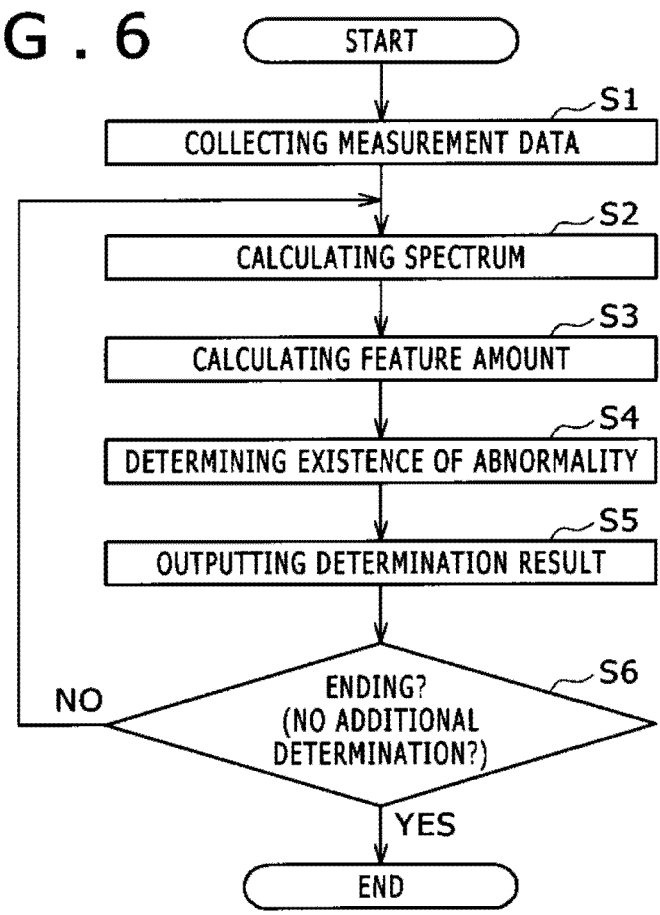
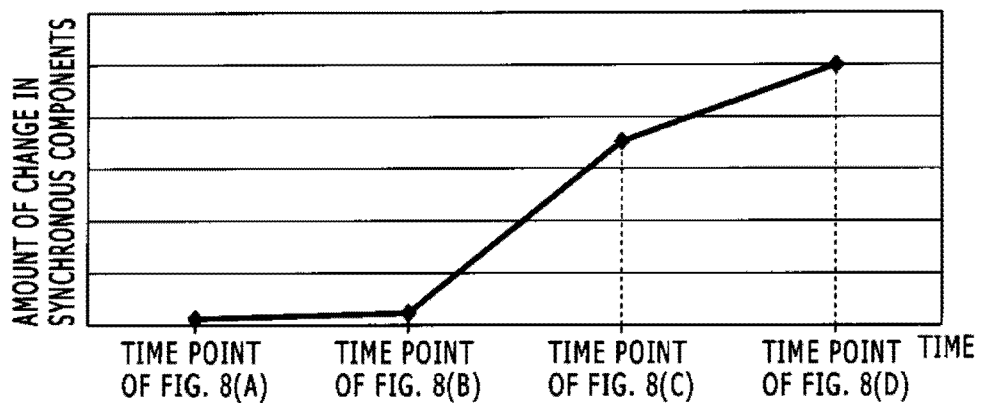

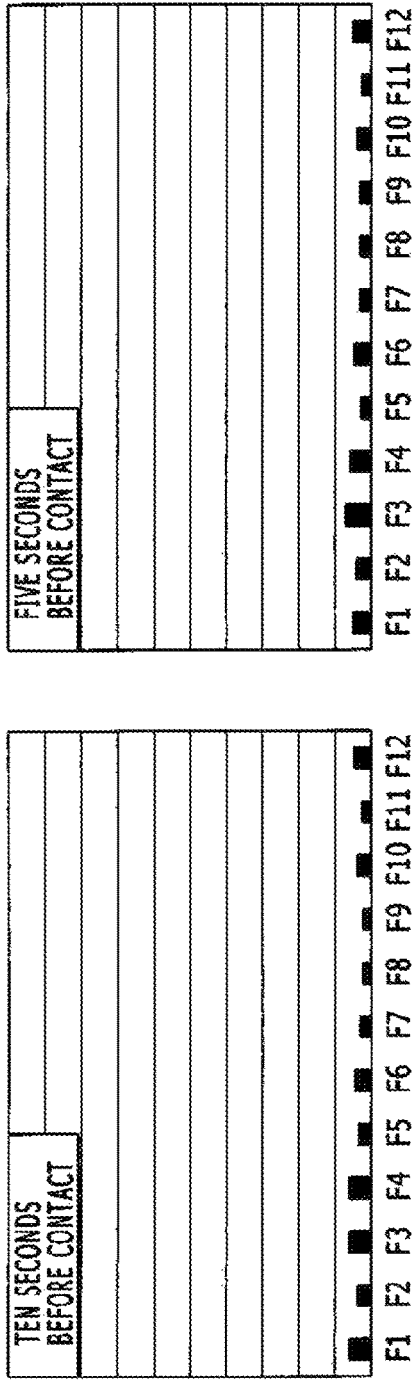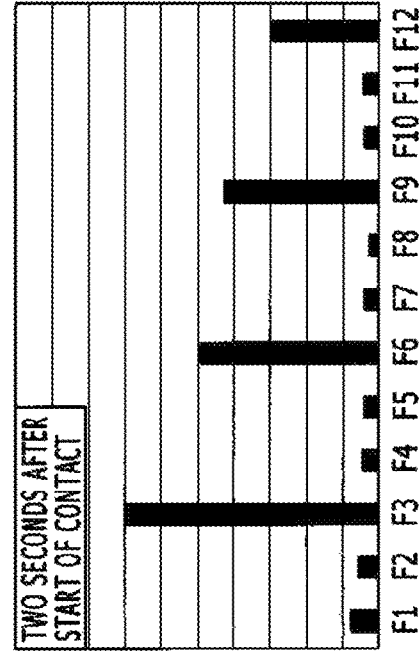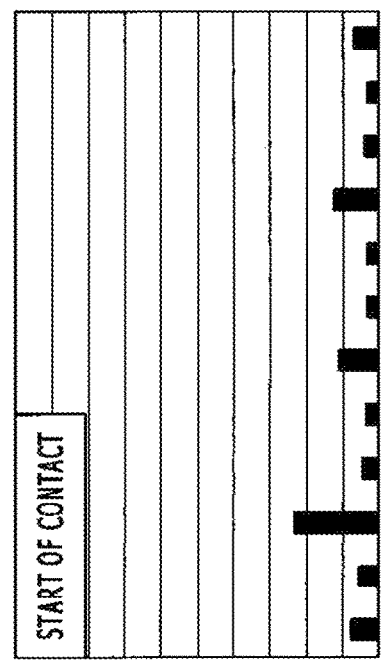

FIG.10

| CONTACT MODEL | a1 | a2 | a3 | a4 | a5 | a6 | a7 | a8 | a9 | a10 | a11 | a12 |
|---|---|---|---|---|---|---|---|---|---|---|---|---|
| ONE LOBE MESH CONTACT AMONG 12 LOBE MESHES | 0.214 | 0.171 | 0.137 | 0.110 | 0.088 | 0.070 | 0.056 | 0.045 | 0.036 | 0.029 | 0.023 | 0.018 |
| TWO LOBE MESH CONTACTS AMONG 12 LOBE MESHES | | 0.271 | 0.339 | 0.217 | | 0.173 | | 0.139 | | 0.111 | | 0.089 |
| THREE LOBE MESH CONTACTS AMONG 12 LOBE MESHES | | | | | | 0.271 | | | 0.217 | | | 0.174 |
| FOUR LOBE MESH CONTACTS AMONG 12 LOBE MESHES | | | | 0.410 | | | | 0.328 | | | | 0.262 |
| SIX LOBE MESH CONTACTS AMONG 12 LOBE MESHES | | | | | | 0.555 | | | | | | 0.444 |
| TWELVE LOBE MESH CONTACTS AMONG 12 LOBE MESHES | | | | | | | | | | | | 1.000 |

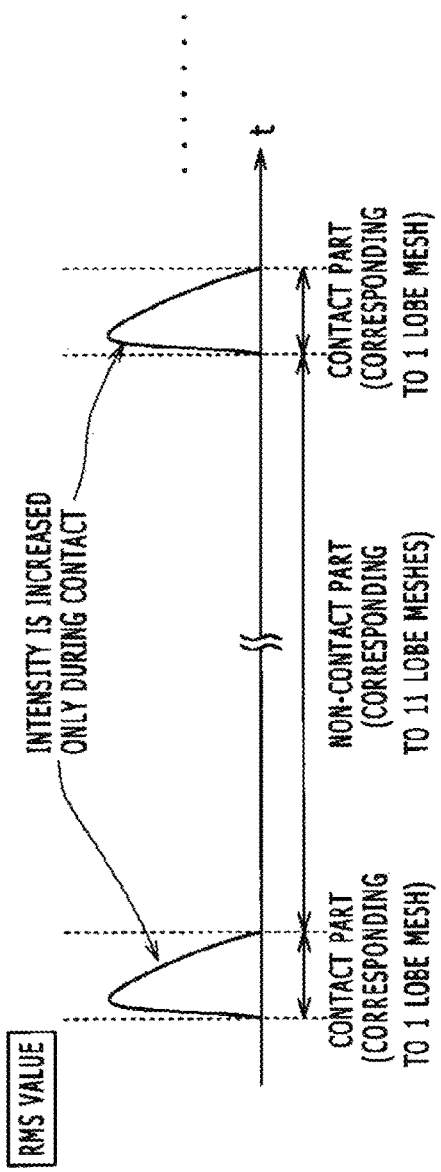
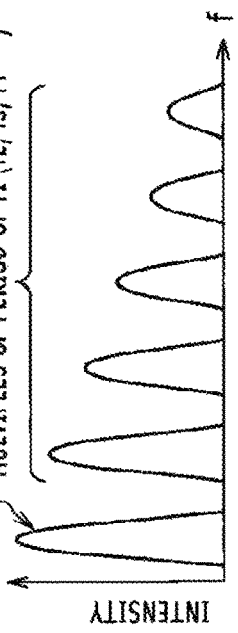
FIG. 11A
FIG. 11B

ROTARY MACHINE ABNORMALITY DETECTION DEVICE AND METHOD THEREOF AND ROTARY MACHINE

BACKGROUND OF THE INVENTION

Field of the Invention

The present invention relates to a rotary machine abnormality detection device for detecting abnormality of a rotary machine, a rotary machine abnormality detection method, and a rotary machine provided with the rotary machine abnormality detection device.

Description of the Related Art

A rotary machine such as, for example, an electric motor, a generator, a compressor, and a pump, comprises a rotating body that rotates axially with respect to a prescribed axis. Such a rotary machine is used in various plants and abnormality of the rotary machine is detected to secure a normal operation state. Techniques for detecting such abnormality are disclosed, for example, in JP 5-231361 A and JP 9-133577 A.

A diagnostic device of compressor disclosed in the above-mentioned JP 5-231361 A comprises an AE sensor for detecting an AE wave generated by a contact of a male rotor and a female rotor during rotor rotation in a non contact-type oil free screw compressor, an amplifier for amplifying and demodulating the detected AE signal, a device for subjecting the amplifier output to a frequency analysis and an addition averaging processing, a rotor rotation pulse detector for detecting a rotation signal of the rotors and converting the rotation signal into a rotation pulse, and a device for comparing the processing result with a criterion based on the rotation signal, and evaluating and outputting the existence of contact of rotors and the like. More specifically, in the diagnostic device of compressor disclosed in the above-mentioned JP 5-231361 A, the existence of contact of rotors is determined by comparing the AE signals of rotational first-order period frequencies of the male rotor and the female rotor, which are generated when the rotors contact each other once per rotation, with a threshold value, or comparing the AE signals of rotational second-order period frequencies, which are generated when the rotors contact each other twice per rotation, with a threshold value.

An abnormal contact detection device disclosed in the above-mentioned JP 9-133577 A detects an abnormal contact state in a rotary machine in which a first rotor and a second rotor rotate as a pair, and comprises an AE sensor for detecting an elastic wave signal emitted from the rotary machine, a demodulation circuit for demodulating the elastic wave signal, a contact determination portion for determining a contact based on a demodulation signal that is demodulated by the demodulation circuit, and an output portion for outputting a result determined by the contact determination portion. More specifically, the contact determination portion determines a contact between the rotors when at least one of a rotational frequency component of the first rotor and a rotational frequency component of the second rotor is included in the demodulation signal at a prescribed level or more. It determines a contact between the rotor and a casing when a frequency component obtained by multiplying the number of blades of the first rotor by a rotational frequency of the rotor and a frequency component obtained by multiplying the number of blades of the second rotor by a rotational frequency of the rotor are included in the demodulation signal at a prescribed level or more. It determines a contact between a sealing material and the rotor when all of the rotational frequency component of the first rotor, the rotational frequency component of the second rotor, the frequency component obtained by multiplying the number of blades of the first rotor by the rotational frequency of the rotor and the frequency component obtained by multiplying the number of blades of the second rotor by the rotational frequency of the rotor are included in the demodulation signal at less than their prescribed levels, and the demodulation signal is more than a prescribed level.

Specifically, in the diagnostic device of compressor disclosed in the above-mentioned JP 5-231361 A, the detection is performed in such cases where the rotors contact each other once per rotation, the rotors contact each other twice per rotation, and the like. For example, when the male rotor has 4 blades A1 to A4 and the female rotor has 6 concave portions B1 to B6 which engage with the blades, combinations of the blades A1 to A4 and the concave portions B1 to B6 have 12 patterns, and all combinations are achieved when the male rotor rotates 3 times and the female rotor rotates twice (one cycle of 12 combinations are completed and the initial combination starts over). Thus, when the detection is performed in a case where the rotors contact each other once per rotation, the diagnostic device of compressor disclosed in the above-mentioned JP 5-231361 A performs the detection when the blade A1 contacts the concave portion B1, the concave portion B5, and the concave portion B3 while the male rotor rotates 3 times and the female rotor rotates twice. In this example, the diagnostic device performs the detection without being able to discriminate the following cases: a case in which the blade A1 contacts only the concave portion B1 while the male rotor rotates 3 times and the female rotor rotates twice; a case in which the blade A1 contacts only the concave portion B5 while the male rotor rotates 3 times and the female rotor rotates twice; and a case in which the blade A1 contacts only the concave portion B3 while the male rotor rotates 3 times and the female rotor rotates twice. That is, the diagnostic device of compressor disclosed in the above-mentioned JP 5-231361 A cannot individually detect contact conditions of 12 different patterns. In reality, however, there is such a case where the blade A1 contacts only the concave portion B1 while the male rotor rotates 3 times and the female rotor rotates twice. Thus, the detection of such an individual contact is needed. Further, the above-mentioned JP 5-231361 A describes an engagement between the male rotor and the female rotor, however, this engagement refers to a case where any given blade of the male rotor contacts any given concave portion of the female rotor. Therefore, the diagnostic device of compressor disclosed in the above-mentioned JP 5-231361 A cannot individually detect the contact conditions of 12 different patterns.

Further, the abnormal contact detection device disclosed in the above-mentioned JP 9-133577 A determines the contact between the rotors themselves, the contact between the rotor and the casing, and the contact between the sealing material and the rotor, but does not detect individual conditions of these contacts.

The present invention is made in view of the above circumstances and the object of the invention is to provide a rotary machine abnormality detection device capable of determining abnormality with higher accuracy, a rotary machine abnormality detection method, and a rotary machine provided with the rotary machine abnormality detection device.

SUMMARY OF THE INVENTION

As a result of extensive research, the inventors have found that the object can be achieved by the following present invention. That is, a rotary machine abnormality detection device according to one embodiment of the present invention detects abnormality in a rotary machine comprising at least first and second rotating bodies, which rotate axially with respect to a corresponding prescribed axis while being engaged with each other by having a prescribed space therebetween under a normal condition. The rotary machine abnormality detection device is characterized in that the device comprises: a vibration measuring portion for measuring a vibration caused by at least one of the first and second rotating bodies; a spectrum processing portion for obtaining a frequency spectrum of measurement data measured by the vibration measuring portion; a feature amount processing portion for obtaining a specific feature amount corresponding to a specific frequency component based on the frequency spectrum obtained by the spectrum processing portion; and an abnormality determination portion for determining the existence of abnormality in the rotary machine based on the feature amount obtained by the feature amount processing portion, and that, when a first number of teeth and a first rotational frequency of the first rotating body are represented by MA [unit] and VA [Hz], respectively, a second number of teeth of the second rotating body is represented by MB [unit], the least common multiple of the first number of teeth MA and the second number of teeth MB is represented by XAB, a fundamental wave lobe mesh frequency VA/MA obtained by dividing the first rotational frequency VA by the first number of teeth MA is represented by f1 [Hz], and n-th harmonic wave lobe mesh frequencies (n: integer of ≥2) with respect to the fundamental wave lobe mesh frequency f1 are represented by fn [Hz], the feature amount processing portion obtains, from the frequency spectrum, a fundamental wave component F1 of the fundamental wave lobe mesh frequency f1, and n-th harmonic wave components Fn of the n-th harmonic wave lobe mesh frequencies fn (n=2 to XAB) up to the least common multiple XAB-th harmonic wave, and then obtains the specific feature amount based on the determined fundamental wave component F1 and n-th harmonic wave components Fn. It is to be noted that the term "lobe mesh" as used herein is a synonym to "tooth mesh". The vibration measuring portion in the above-mentioned rotary machine abnormality detection device preferably measures a vibration in at least one of an audible band and an ultrasonic wave band. The spectrum processing portion in the above-mentioned rotary machine abnormality detection device preferably obtains RMS (Root Mean Square) of measurement data measured by the vibration measuring portion, and then obtains a frequency spectrum (power spectrum) of the measurement data by applying Fourier transform (preferably fast Fourier transform) to the determined RMA of the measurement data. The spectrum processing portion in the above-mentioned rotary machine abnormality detection device preferably obtains an envelope of the measurement data measured by the vibration measuring portion, and then obtains a frequency spectrum (power spectrum) of the measurement data by applying Fourier transform (preferably fast Fourier transform) to the determined envelope of the measurement data. The feature amount processing portion in the above-mentioned rotary machine abnormality detection device preferably obtains a total sum of the determined fundamental wave component F1 and n-th harmonic wave components Fn as the specific feature amount. The abnormality determination portion in the above-mentioned rotary machine abnormality detection device preferably determines the existence of abnormality in the rotary machine depending on whether or not the feature amount obtained by the feature amount processing portion is equal to or higher than a preset prescribed threshold.

When the frequency VA/MA obtained by dividing the first rotational frequency VA by the first number of teeth MA is represented by the fundamental wave lobe mesh frequency f1 [Hz] and the least common multiple of the first number of teeth MA and the second number of teeth MB is represented by XAB, such a rotary machine abnormality detection device obtains, from the frequency spectrum, the fundamental wave component F1 of the fundamental wave lobe mesh frequency f1, and the n-th harmonic wave components Fn of the n-th harmonic wave lobe mesh frequencies fn (n=2 to XAB) with respect to the fundamental wave lobe mesh frequency f1 up to the least common multiple XAB-th harmonic wave. Thus, the device can obtain the frequency components F1 to Fn corresponding to all combinations of contacts between the first and second rotating bodies. The above-mentioned rotary machine abnormality detection device then determines the existence of contact based on the frequency components F1 to Fn corresponding to all combinations of contacts and thus can determine abnormality with higher accuracy.

Further, in another embodiment, the above-mentioned rotary machine abnormality detection device is characterized in that the spectrum processing portion obtains first and second frequency spectra of first and second measurement data measured in first and second periods different from each other, respectively, and the feature amount processing portion obtains the fundamental wave components F1 and the n-th harmonic wave components Fn from both the first and second frequency spectra measured in the first and second periods, respectively, and then obtains an amount of change of the determined fundamental wave components F1 and the n-th harmonic wave components Fn in each of the first and second periods as the specific feature amount. The feature amount processing portion in the above-mentioned rotary machine abnormality detection device preferably obtains a square sum of differences of the determined fundamental wave components F1 and n-th harmonic wave components Fn in each of the first and second periods for each component as the amount of change.

An output of the vibration measuring portion changes relatively large before and after a point of time when a contact occurs as abnormality. However, the output of the vibration measuring portion also gradually changes in some occasions without contact, for example, when an operating condition of the rotary machine changes. The amount of change of the fundamental wave components F1 and the n-th harmonic wave components Fn in each of the first and second periods, especially the square sum of differences of these components, indicates a change in periodicity of contact and thus have characteristic of becoming relatively large when a contact occurs from a non-contact state and when a contact state itself changes. The rotary machine abnormality detection device obtains such an amount of change as the specific feature amount and thus can detect the points of time when a contact occurs from a non-contact state and when a contact state itself changes with higher accuracy. Further, the amount of change does not become large even when a background noise is relatively large unless there is a change in a trend of the background noise, thus the rotary machine abnormality detection device can reduce the frequency of the misdetection.

Further, in another embodiment, the above-mentioned rotary machine abnormality detection device is characterized in that the feature amount processing portion further obtains, from the frequency spectrum, a non-harmonic wave component G of a specific frequency g residing between frequencies that are adjacent to each other, the frequencies being composed of the fundamental wave lobe mesh frequency f1 and the n-th harmonic wave lobe mesh frequencies fn (n=2 to XAB) up to the least common multiple XAB-th harmonic wave, and then obtains the specific feature amount based on the determined fundamental wave component F1, n-th harmonic wave components Fn, and non-harmonic wave components G. In the above-mentioned rotary machine abnormality detection device, the non-harmonic wave component G is preferably a component of frequency residing at a center between the adjacent frequencies (Gk=(Fk+Fk+1)/2, k: integer from 1 to XAB−1) from the viewpoint of obtaining a frequency farthest from the fundamental wave lobe mesh frequency f1 and the n-th harmonic wave lobe mesh frequencies fn. In the above-mentioned rotary machine abnormality detection device, the feature amount processing portion preferably further obtains, from the frequency spectrum, a non-harmonic wave component Gk (k: integer in a range of from 1 to XAB−1) of a specific frequency gk residing between frequencies that are adjacent to each other, the frequencies being composed of the fundamental wave lobe mesh frequency f1 and the n-th harmonic wave lobe mesh frequencies fn (n=2 to XAB) up to the least common multiple XAB-th harmonic wave, and then obtains a total sum ratio of component provided by dividing a total sum of the determined fundamental wave component F1 and n-th harmonic wave components Fn by a total sum of the determined non-harmonic wave components Gk as the specific feature amount.

The output of the vibration measuring portion is sometimes superposed with a single-shot electrical noise and the like. The rotary machine abnormality detection device obtains the specific feature amount by further considering the non-harmonic wave components G and thus can avoid influence of superposition of such a single-shot electrical noise and the like on detection of abnormality, thereby enabling to reduce a noise having no periodicity.

Further, in another embodiment, the above-mentioned rotary machine abnormality detection device is characterized in that the device further comprises a model information storage portion for storing in advance, as model information, model values of the fundamental wave component F1 and the n-th harmonic wave components Fn corresponding to each condition of abnormality occurring in the first and second rotating bodies, and the feature amount processing portion obtains a matching degree representing a degree of matching between the determined fundamental wave component F1 and n-th harmonic wave components Fn, and the model information for each condition of abnormality, and then obtains a maximum matching degree among the matching degrees obtained for each condition of abnormality as the specific feature amount.

Such a rotary machine abnormality detection device obtains the maximum matching degree among the matching degrees obtained for each condition of abnormality as the specific feature amount and thus can discriminate abnormality caused, for example, by a contact or the like from an electrical pulse noise and a single-shot noise having a relatively large amplitude, cause by an impact from the outside, thereby enabling to detect abnormality with higher accuracy.

Further, in another embodiment, the above-mentioned rotary machine abnormality detection device is characterized in that the abnormality determination portion determines the presence of abnormality in the rotary machine in the condition of abnormality having the maximum matching degree among the matching degrees obtained, for each condition of abnormality, by the feature amount processing portion.

Such a rotary machine abnormality detection device can detect the condition of abnormality.

Further, in another embodiment, the above-mentioned rotary machine abnormality detection device is characterized in that the device further comprises a model information storage portion for storing in advance, as model information, model values of the fundamental wave component F1 and the n-th harmonic wave components Fn corresponding to each condition of abnormality occurring in the first and second rotating bodies, the spectrum processing portion obtains first and second frequency spectra of first and second measurement data measured in first and second periods different from each other, respectively, and the feature amount processing portion performs a plurality of processings among the following processings: a total sum calculation processing for obtaining a total sum of the determined fundamental wave component F1 and n-th harmonic wave components Fn; an amount of change calculation processing for obtaining the fundamental wave components F1 and the n-th harmonic wave components Fn both from the first and second frequency spectra measured in the first and second periods, respectively, and then obtaining an amount of change of the determined fundamental wave components F1 and n-th harmonic wave components Fn in each of the first and second periods; a total sum ratio of component calculation processing for further obtaining, from the frequency spectra, a non-harmonic wave component Gi (i: integer in a range from 1 to n−1) of a specific frequency gi residing between frequencies that are adjacent to each other, the frequencies being composed of the fundamental wave lobe mesh frequency f1 and the n-th harmonic wave lobe mesh frequencies fn (n=2 to XAB) up to the least common multiple XAB-th harmonic wave, and then obtaining a total sum ratio of component provided by dividing a total sum of the determined fundamental wave component F1 and n-th harmonic wave components Fn by a total sum of the determined non-harmonic wave components Gi; and a maximum matching degree calculation processing for obtaining a matching degree representing a degree of matching between the determined fundamental wave component F1 and n-th harmonic wave components Fn, and the model information for each condition of abnormality, and then obtaining a maximum matching degree among the matching degrees obtained for each condition of abnormality, and then obtains the specific feature amount based on processing results of the plurality of processings that have been performed.

Such a rotary machine abnormality detection device obtains the specific feature amount based on the processing results obtained by performing the plurality of processings and thus can detect abnormality with higher accuracy.

Further, in another embodiment, the above-mentioned rotary machine abnormality detection device is characterized in that the spectrum processing portion comprises a high pass filter for eliminating a noise and a spectrum portion for obtaining a frequency spectrum of measurement data having passed through the high pass filter.

Such a rotary machine abnormality detection device comprises the high pass filter and thus can eliminate a background noise distributed in a relatively low frequency band. As a result, the rotary machine abnormality detection device can detect abnormality with higher accuracy.

Further, a rotary machine abnormality detection method according to another embodiment of the present invention detects abnormality in a rotary machine comprising first and second rotating bodies, which rotate axially with respect to a corresponding prescribed axis while being engaged with each other by having a prescribed space therebetween under a normal condition, and is characterized in that the method comprises: a vibration measuring step for measuring a vibration caused by at least one of the first and second rotating bodies; a spectrum processing step for obtaining a frequency spectrum of measurement data measured in the vibration measuring step; a feature amount processing step for obtaining a specific feature amount corresponding to a specific frequency component based on the frequency spectrum obtained in the spectrum processing step; and an abnormality determination step for determining the existence of abnormality in the rotary machine based on the feature amount obtained in the feature amount processing portion, and, when a first number of teeth and a first rotational frequency of the first rotating body are represented by MA [unit] and VA [Hz], respectively, a second number of teeth of the second rotating body is represented by MB [unit], the least common multiple of the first number of teeth MA and the second number of teeth MB is represented by XAB, a fundamental wave lobe mesh frequency VA/MA obtained by dividing the first rotational frequency VA by the first number of teeth MA is represented by f1 [Hz], and n-th harmonic wave lobe mesh frequencies (n: integer of ≥2) with respect to the fundamental wave lobe mesh frequency f1 are represented by fn [Hz], the feature amount processing portion obtains, from the frequency spectrum, a fundamental wave component F1 of the fundamental wave lobe mesh frequency f1 and n-th harmonic wave components Fn of the n-th harmonic wave lobe mesh frequencies fn (n=2 to XAB) up to the least common multiple XAB-th harmonic wave, and then obtains the specific feature amount based on the determined fundamental wave component F1 and n-th harmonic wave components Fn.

When the frequency VA/MA obtained by dividing the first rotational frequency VA by the first number of teeth MA is represented by the fundamental wave lobe mesh frequency f1 [Hz] and the least common multiple of the first number of teeth MA and the second number of teeth MB is represented by XAB, such a rotary machine abnormality detection method obtains, from the frequency spectrum, the fundamental wave component F1 of the fundamental wave lobe mesh frequency f1 and the n-th harmonic wave components Fn of the n-th harmonic wave lobe mesh frequencies fn (n=2 to XAB) with respect to the fundamental wave lobe mesh frequency f1 up to the least common multiple XAB-th harmonic wave, and thus can obtain frequency components from F1 to Fn corresponding to all combinations of contacts between the first and second rotating bodies. Since the rotary machine abnormality detection method determines the existence of contact based on the frequency components F1 to Fn corresponding to all combinations of contacts, the method can determine abnormality with higher accuracy.

Further, another embodiment of the present invention is a rotary machine equipped with any one of the rotary machine abnormality detection devices described above.

According to this embodiment, there is provided the rotary machine comprising any one of the rotary machine abnormality detection devices described above, and such a rotary machine can determine abnormality with higher accuracy by comprising any one of the rotary machine abnormality detection devices described above.

The rotary machine abnormality detection device and the rotary machine abnormality detection method according to the present invention can determine abnormality with higher accuracy. According to the present invention, there can be provided a rotary machine comprising such a rotary machine abnormality detection device.

BRIEF DESCRIPTION OF THE DRAWINGS

FIG. 6 is a flowchart describing operations of the rotary machine abnormality detection device in the embodiment.

FIG. 7 is a diagram for explaining a feature amount of a second embodiment.

FIGS. 8A-8D are diagrams illustrating a temporal change in a frequency spectrum before and after the occurrence of abnormality.

FIG. 10 is a diagram illustrating one example of model information related to a feature amount of a fourth embodiment.

FIGS. 11A-11B are diagrams for explaining a procedure for obtaining the model information in FIG. 10.

DESCRIPTION OF THE PREFERRED EMBODIMENTS

Figure 1:
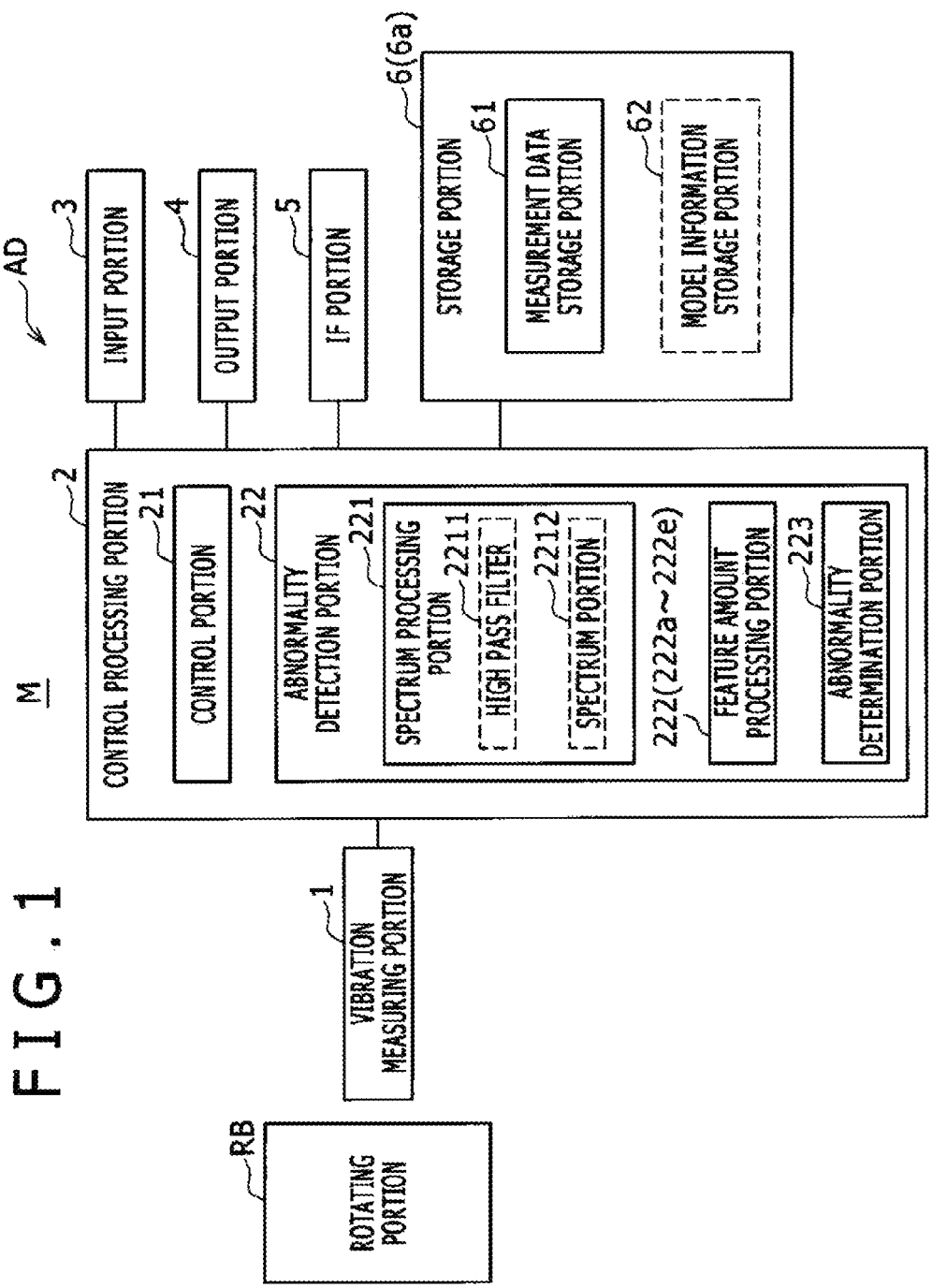
FIG. 1 is a block diagram illustrating a configuration of a rotary machine and a rotary machine abnormality detection device provided thereto in an embodiment.

Hereinafter, one embodiment according to the present invention will be described with reference to the drawings. It is noted that configurations assigned with the same reference sign in the drawings mean that they are identical, and therefore duplicated description thereof will be omitted appropriately. In the present specification, reference signs without suffixes collectively identify corresponding configurations, and reference signs with suffixes individually identify corresponding configurations.

Figure 2:
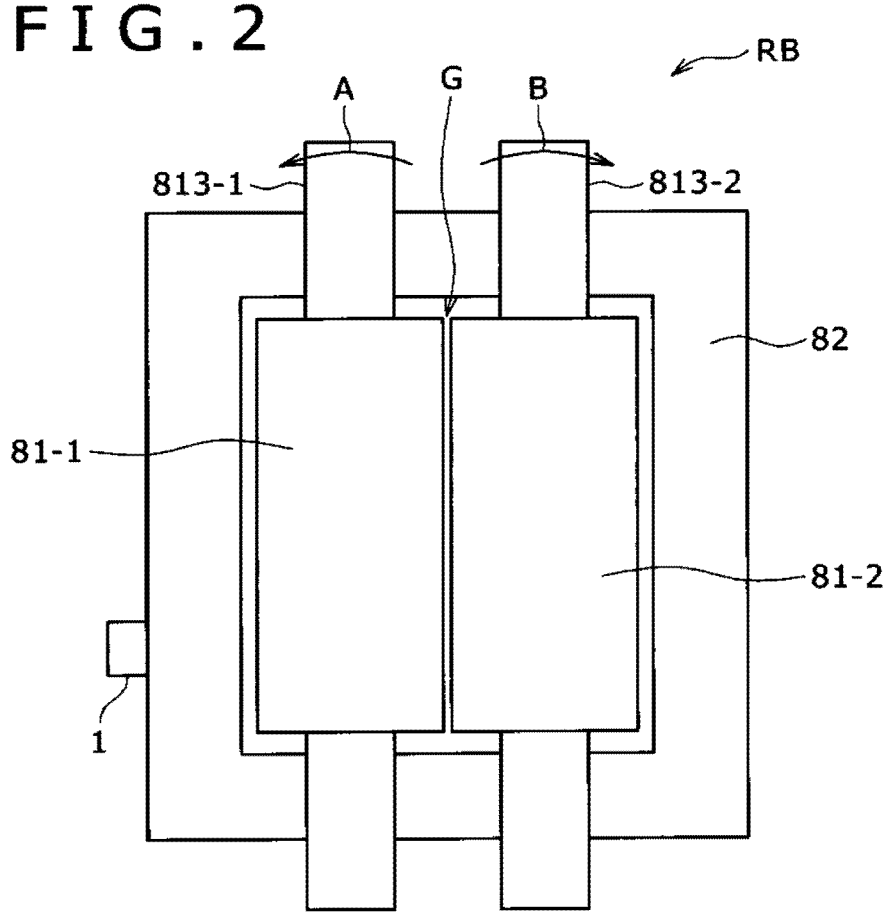
FIG. 2 is a top schematic view of one example of a rotating body in the rotary machine in FIG. 1.
Figure 3:
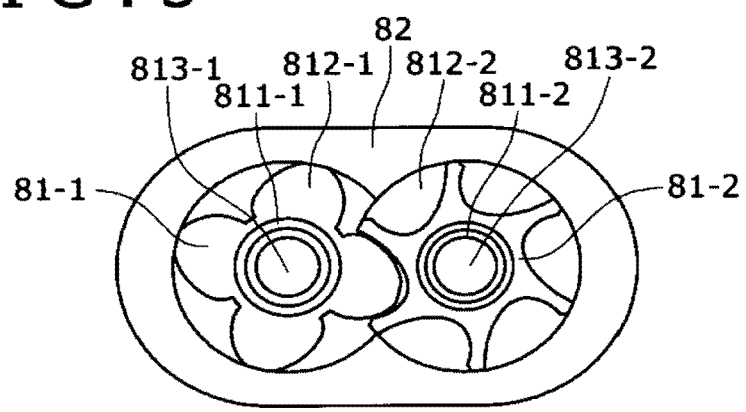
FIG. 3 is a schematic sectional view of the rotating body in FIG. 2.
Figure 4A:
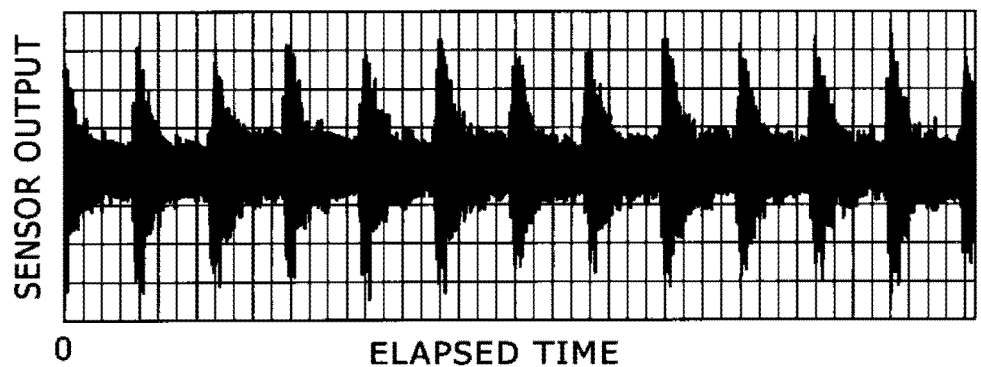
FIGS. 4A-4C are diagrams for explaining a spectrum processing with a relatively low background noise.
Figure 4B:
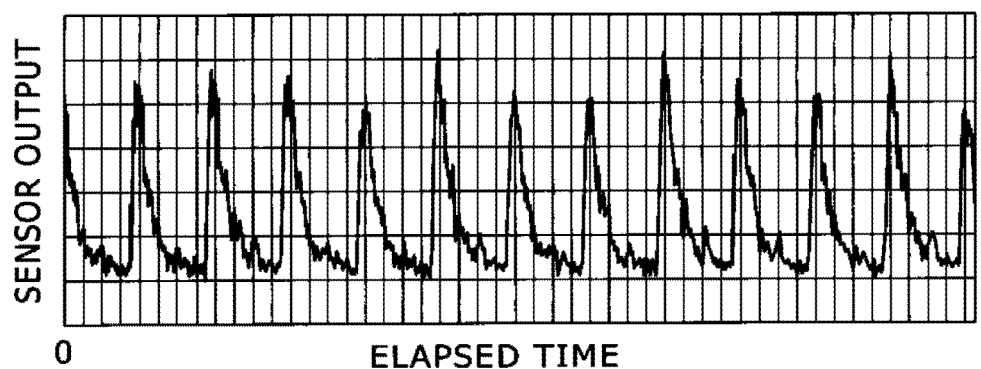
Figure 4C:
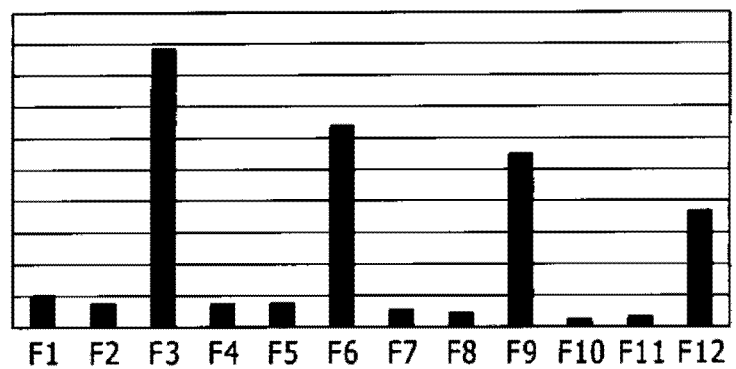

FIG. 1 is a block diagram illustrating a configuration of a rotary machine and a rotary machine abnormality detection device provided thereto in an embodiment. FIG. 2 is a top schematic view of one example of a rotating body in the rotary machine in FIG. 1. FIG. 3 is a schematic sectional view of the rotating body in FIG. 2. FIG. 4 is a diagram for explaining a spectrum processing with a relatively low background noise. FIG. 4A shows measurement data measured by an AE sensor, FIG. 4B shows RMS of the measurement data, and FIG. 4C shows a frequency spectrum of the measurement data. The lateral axis of FIG. 4A indicates time (elapsed time from start of measurement) while the vertical axis indicates an output level of sensor output. The lateral axis of FIG. 4B indicates time (elapsed time from start of measurement) while the vertical axis indicates an RMS value. The lateral axis of FIG. 4C indicates a frequency while the vertical axis indicates a component value.

Figure 5A:
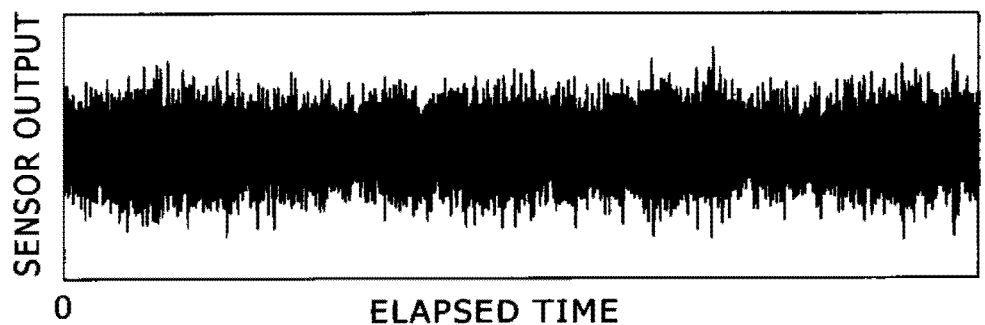
FIGS. 5A-5B are diagrams for explaining a spectrum processing with a relatively high background noise.
Figure 5B:
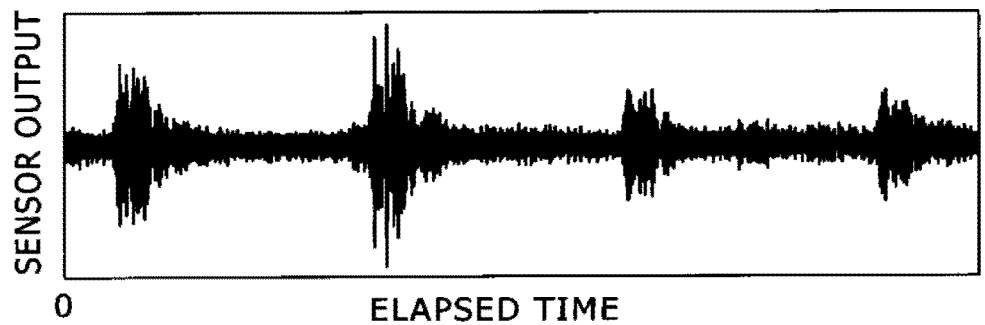

FIG. 5 is a diagram for explaining a spectrum processing with a relatively high background noise. FIG. 5A shows measurement data measured by an AE sensor and FIG. 5B shows the measurement data having passed through a high pass filter. The lateral axes of FIG. 5A and FIG. 5B indicate time (elapsed time from start of measurement) while the vertical axes indicate an output level of sensor output.

A rotary machine in the embodiment is a device that comprises a rotating body rotating axially with respect to a prescribed axis, and in the present embodiment, the rotary machine further comprises a rotary machine abnormality detection device for detecting abnormality in the rotating body. More specifically, for example, as shown in FIG. 1, a rotary machine M comprises a rotating portion RB having at least first and second rotating bodies and a rotary machine abnormality detection device AD. The rotary machine abnormality detection device AD comprises, for example, a vibration measuring portion 1 and a control processing portion 2 having an abnormality detection portion 22. In an example shown in FIG. 1, the rotary machine abnormality detection device AD further comprises an input portion 3, an output portion 4, an interface portion (IF portion) 5, and a storage portion 6.

The rotary machine M installed with the rotary machine abnormality detection device AD of the present embodiment may be any device that contains the rotating portion RB, such as, for example, an electric motor, a generator, a compressor, and a pump. In this description, as one example, a case where the rotary machine M is a compressor is described below.

The rotary machine M as a compressor comprises at least the first and second rotating bodies, and further comprises the rotating portion RB, which functions as a compressor for pressure-feeding fluid, and a peripheral device not illustrated for rotatably driving the rotating bodies. The rotating portion RB comprises, for example, as shown in FIG. 2 and FIG. 3, a pair of first and second rotating bodies 81-1 and 81-2, which rotate axially with respect to a corresponding prescribed axis while being engaged so as to mate with each other by having a prescribed gap G therebetween under a normal condition, and a casing 82 for housing the first and second rotating bodies 81-1 and 81-2.

The first rotating body 81-1 is a male rotor in the compressor and generally comprises a first rotating body main body 811-1, a plurality of convex portions 812-1 formed on a peripheral surface of the first rotating body main body, and a first rotating axis 813-1 coaxially provided in the first rotating body main body 811-1. Such a first rotating body 81-1 is rotationally driven, for example, counterclockwise (in a direction of arrow A) around the first rotating axis 813-1. The second rotating body 81-2 is a female rotor in the compressor and generally comprises a second rotating body main body 811-2, a plurality of concave portions 812-2 formed on a peripheral surface of the second rotating body main body, and a second rotating axis 813-2 coaxially provided in the second rotating body main body 811-2. Such a second rotating body 81-2 is rotationally driven, for example, clockwise (in a direction of arrow B) around the second rotating axis 813-2.

Hereinafter, the term "plurality of convex portions 812-1" refers to the plurality of convex portions 812-1 formed on the peripheral surface of the first rotating body 81-1 and the term "convex portion 812-1" refers to any one of the plurality of convex portions 812-1. The term "plurality of concave portions 812-2" refers to the plurality of concave portions 812-1 formed on the peripheral surface of the second rotating body 81-2 and the term "concave portion 812-2" refers to any one of the plurality of concave portions 812-2.

When the first rotating body 81-1 rotates counterclockwise and the second rotating body 81-2 rotates clockwise, the convex portion 812-1 mates with the corresponding concave portion 812-2 in consecutive order between the plurality of convex portions 812-1 and the plurality of concave portions 812-2. Specifically, when the first rotating body 81-1 rotates counterclockwise and the second rotating body 81-2 rotates clockwise, a given convex portion 812-1 mates with a corresponding concave portion 812-2, but their mating is dissolved as they are further rotated, thereby causing another mating between the next convex portion 812-1 and the next concave portion 812-2. Their mating is also dissolved as they are further rotated, thereby causing another mating between the next convex portion 812-1 and the next concave portion 812-2. This process is repeated hereafter to compress fluid.

In a normal condition, mating between the convex portion 812-1 and the concave portion 812-2 occurs in a manner such that the convex portion 812-1 is inserted into the concave portion 812-2 with the prescribed gap G therebetween without contacting each other. A contact between the convex portion 812-1 and the concave portion 812-2 is interpreted as a contact between the first rotating body 81-1 and the second rotating body 81-2, representing one of abnormality conditions.

The casing 82 is a hollow cylindrical body having an elliptical shape in a cross section, which has a space for housing the first and second rotating bodies 81-1 and 81-2 disposed at a prescribed distance apart from an inner peripheral surface of the casing 82 in such a manner that their axes are in parallel to each other. The casing 82 comprises an inflow port not illustrated for taking in fluid to be compressed at one side in the axis direction of the first and second rotating bodies 81-1 and 81-2, and an outlet port not illustrated for taking out the fluid compressed by the first and second rotating bodies 81-1 and 81-2 at the other side.

Further, in the present embodiment, a vibration measuring portion 1 is disposed on an outer wall of the casing 82 at a preset prescribed position to detect abnormality in the rotating bodies by the rotary machine abnormality detection device AD. It is noted that a plurality of the vibration measuring portions 1 may be disposed at different positions of the casing 82. In FIG. 2, as such an example, the vibration measuring portion 1 is disposed on the outer wall of the casing 82 at a position slanted to one side from a substantially center position in the axis direction.

The vibration measuring portion 1 is a device that is connected to the control processing portion 2 and measures a vibration caused by a rotating body 81 to detect abnormality generated in the rotary machine M, especially in the rotating body 81 of the rotating portion RB. In the present embodiment, the vibration measuring portion 1 measures a vibration caused by at least one of the first and second rotating bodies 81-1 and 81-2. The vibration measuring portion 1 preferably measures a vibration in at least one of an audible band and an ultrasonic wave band. It is noted that the audible band is generally within a range of 20 Hz to 20 kHz and the ultrasonic wave band generally covers a range of ≥20 kHz. Such a vibration measuring portion 1 comprises, for example, an AE (Acoustic Emission) sensor and the like. The vibration measuring portion 1 comprising the AE sensor detects and measures an elastic wave in a prescribed wavelength band caused by the rotating body 81 due to abnormality such as, for example, a contact. A measurement result measured by the vibration measuring portion 1 is outputted to the control processing portion 2. More specifically, the vibration measuring portion 1 detects a vibration and outputs the measurement result of the vibration to the control processing portion 2. The control processing portion 2 samples the measurement result inputted from the vibration measuring portion 1 at preset prescribed time intervals (sampling intervals) as measurement data. In this manner, the control processing portion 2 obtains the measurement data continuous in time series at the sampling intervals.

The input portion 3 is a device that is connected to the control processing portion 2 and inputs to the rotary machine abnormality detection device AD (rotary machine M) various kinds of commands such as, for example, a command that instructs the start of abnormality detection, and various kinds of data necessary for detecting abnormality, for example, in an input of identifiers and the like in the rotary machine M (or rotating body 81) that is a subject to the abnormality detection. The input portion 3 includes, for example, a plurality of input switches and the like assigned with specified functions, a keyboard, a mouse and the like. The output portion 4 is a device that is connected to the control processing portion 2 and outputs commands and data inputted from the input portion 3 and results detected and measured by the rotary machine abnormality detection device AD according to the control of the control processing portion 2. The output portion 4 includes, for example, a display device such as a CRT display, a LCD, and an organic EL display, and a printing device such as a printer.

The IF portion 5 is a circuit that is connected to the control processing portion 2 and performs input/output of data from/to an external device according to the control of the control processing portion 2. The IF portion 5 includes, for example, an RS-232C interface circuit having a serial communication system and an interface circuit using a USB (Universal Serial Bus) standard.

The storage portion 6 is connected to the control processing portion 2 and stores, according to the control of the control processing portion 2, control processing programs such as a control program for operating an individual portion of the rotary machine abnormality detection device AD according to its function and a rotary machine abnormality detection program for detecting abnormality in the rotary machine M, and information and the like needed to execute the control processing programs. The storage portion 6 also serves as so-called a working memory for the control processing portion 2. The storage portion 6 comprises a non-volatile storage element such as, for example, ROM (Read Only Memory) and a rewritable non-volatile storage element such as EEPROM (Electrically Erasable Programmable Read Only Memory) for storing the control processing programs and the information and the like needed for the control processing programs, a volatile storage element such as, for example, RAM (Random Access Memory) serving as a working memory, and a peripheral circuit thereof. The storage portion 6 then stores the measurement data measured by the vibration measuring portion 1. For this purpose, the storage portion 6 is functionally equipped with a measurement data storage portion 61. It is noted that the storage portion 6 may further comprise a storage device with a relatively large capacity such as, for example, a hard disk for storing the measurement data measured by the vibration measuring portion 1 and various kinds of data obtained by applying a prescribed information processing to the measurement data.

The control processing portion 2 controls the individual portion of the rotary machine abnormality detection device AD according to its function in order to detect abnormality in the rotary machine M, and comprises a micro processor such as, for example, CPU (Central Processing Unit), and a peripheral circuit thereof. The control processing portion 2 is then functionally constituted with a control portion 21 and an abnormality detection portion 22 by executing the control processing programs.

The control portion 21 controls the individual portion of the rotary machine abnormality detection device AD according to its function, thereby controlling the entire rotary machine abnormality detection device AD.

The abnormality detection portion 22 detects abnormality in the rotary machine M based on the measurement results measured by the vibration measuring portion 1. More specifically, in the present embodiment, the abnormality detection portion 22 is functionally equipped with a spectrum processing portion 221, a feature amount processing portion 222, and an abnormality determination portion 223 by executing the control processing programs.

The spectrum processing portion 221 obtains a frequency spectrum of the measurement data measured by the vibration measuring portion 1. More specifically, the spectrum processing portion 221 obtains the frequency spectrum (power spectrum) of the measurement data, for example, by obtaining RMS (Root Mean Square) of the measurement data measured by the vibration measuring portion 1 and applying Fourier transform, for example, fast Fourier transform, to the determined RMS of the measurement data. In one example, the spectrum processing portion 221 obtains the RMS of the measurement data shown in FIG. 4B from the measurement data shown in FIG. 4A and then obtains the frequency spectrum (power spectrum) of the measurement data shown in FIG. 4C. It is noted that a time constant of the RMS (the number of measurement data for obtaining RMS) can be appropriately set in consideration of a sampling rate of the vibration measuring portion 1 and a rotation speed of the rotating body 81. Further, FIG. 4 shows a measurement result of the rotary machine M comprising the first rotating body 81-1 having 3 teeth and the second rotating body 81-2 having 4 teeth. In an example shown in FIG. 4C, a third harmonic wave component F3 is the largest, indicating that the second rotating body 81-2 having 4 teeth has a contact once per rotation.

Further, the spectrum processing portion 221 obtains the frequency spectrum (power spectrum) of the measurement data, for example, by obtaining an envelope of the measurement data measured by the vibration measuring portion 1 by an envelope detection and applying Fourier transform (preferably fast Fourier transform) to the determined envelope of the measurement data.

When a background noise is relatively low, for example, as shown in FIG. 4A, the RMS of the measurement data and the envelope of the measurement data may be obtained from the measurement data of the vibration measuring portion 1 as mentioned above. However, when a background noise is relatively high, for example, as shown in FIG. 5A due to, for example, an installation environment of the rotary machine M and the like, a signal indicating abnormality of the rotating body 81 is buried in the background noise and may not appear clearly. In order to extract the signal indicating abnormality of the rotating body 81 in such a case, the spectrum processing portion 221 may comprise, for example, as shown in broken lines in FIG. 1, a high pass filter 2211 for eliminating a noise such as a background noise and a spectrum portion 2212 for obtaining a frequency spectrum of the measurement data, which are measured by the vibration measuring portion 1 and have passed through the high pass filter 2211. A cutoff frequency of the high pass filter 2211 may be appropriately set in consideration of a frequency of the signal indicating abnormality of the rotating body 81. For example, it may be set to a value such as 100 kHz. The spectrum portion 2212 obtains the RMS and the envelope with respect to the measurement data filtered by the high pass filter 2211 and then obtains the frequency spectrum from them.

A feature amount processing portion 222 obtains a specific feature amount CV corresponding to a specific frequency component based on the frequency spectrum obtained by the spectrum processing portion 221. More specifically, when a first number of teeth and a first rotational frequency of the first rotating body 81-1 are represented by MA [unit] and VA [Hz], respectively, a second number of teeth and a second rotational frequency of the second rotating body 81-2 are represented by MB [unit] and VB [Hz], respectively, the least common multiple of the first number of teeth MA and the second number of teeth MB is represented by XAB, a fundamental wave lobe mesh frequency VA/MA obtained by dividing the first rotational frequency VA by the first number of teeth MA is represented by f1 [Hz], and n-th harmonic wave lobe mesh frequencies (n: integer of ≥2) with respect to the fundamental wave lobe mesh frequency f1 are represented by fn [Hz], the feature amount processing portion 222 obtains, from the frequency spectrum obtained by the spectrum processing portion 221, a fundamental wave component F1 of the fundamental wave lobe mesh frequency f1 and n-th harmonic wave components Fn of the n-th harmonic wave lobe mesh frequencies fn (n=2 to XAB) up to the least common multiple XAB-th harmonic wave, and then obtains the specific feature amount CV based on the determined fundamental wave component F1 and n-th harmonic wave components Fn.

The specific feature amount CV corresponding to the specific frequency component can be calculated as various suitable values so as to extract the signal indicating abnormality in the rotating body 81 from the measurement data of the vibration measuring portion 1 and eliminate various noises from the measurement data of the vibration measuring portion 1. Examples of such values include feature amounts CVa to CVe of first to fifth embodiments, respectively. The feature amount CVa of the first embodiment is described here and the feature amounts CVb to CVe of the second to fifth embodiments will be described below.

The feature amount CVa of the first embodiment is, as shown in the following formula 1, a total sum CVa of the determined fundamental wave component F1 and n-th harmonic wave components Fn. Thus, the feature amount processing portion 222 comprises a feature amount processing portion 222a that obtains, from the frequency spectrum obtained by the spectrum processing portion 221, the fundamental wave component F1 of the fundamental wave lobe mesh frequency f1 and the n-th harmonic wave components Fn of the n-th harmonic wave lobe mesh frequencies fn (n=2 to XAB) up to the least common multiple XAB-th harmonic wave, and then obtains the total sum of the determined fundamental wave component F1 and n-th harmonic wave components Fn.

$$CVa = \Sigma Fi \quad (1)$$

Note that i represents an integer of from 1 to XAB and Σ represents an arithmetic operator with index i for calculating the sum of F.

For example, when the first number of teeth MA and the first rotational frequency VA of the first rotating body 81-1 are 3 units and 60 Hz (MA=3, VA=60), respectively, and when the second number of teeth MB and the second rotational frequency VB of the second rotating body 81-2 are 4 units and 45 Hz (MB=4, VB=45), respectively, the least common multiple XAB of the both numbers of teeth is 12, thus combinations of lobe mesh generate 12 patterns. The fundamental wave lobe mesh frequency f1 is calculated as 20 (=60/3) Hz in this example, thus the first and second rotating bodies 81-1 and 81-2 have 12 patterns of lobe mesh frequencies (f1 to f12) as follows: the fundamental wave lobe mesh frequency f1 of 20 Hz and the n-th harmonic wave lobe mesh frequencies fn (n=2 to XAB (=12)) of 40 Hz, 60 Hz, 80 Hz, . . . 200, 220, and 240. In such a case, the feature amount processing portion 222a obtains, from the frequency spectrum, the fundamental wave component F1 of the fundamental wave lobe mesh frequency of 20 Hz and the n-th harmonic wave components Fn of the n-th harmonic wave lobe mesh frequencies fn (n=2 to 12) up to the least common multiple 12-th harmonic wave, and then obtains the total sum of these components as the feature amount CVa of the first embodiment (CVa=ΣFi, i=1 to 12, Σ represents a summing operation with index i).

An abnormality determination portion 223 determines the existence of abnormality in the rotary machine M based on the feature amount CV obtained by the feature amount processing portion 222. More specifically, the abnormality determination portion 223 determines the existence of abnormality in the rotary machine M depending on whether or not the feature amount CV obtained by the feature amount processing portion 222 is equal to or higher than a preset prescribed threshold th. In more detail, when the feature amount CV obtained by the feature amount processing portion 222 is equal to or higher than the prescribed threshold th, the abnormality determination portion 223 determines the presence of abnormality in the rotary machine M, while when the feature amount CV obtained by the feature amount processing portion 222 is not equal to or higher than the prescribed threshold th (when the feature amount CV is less than the prescribed threshold th), the abnormality determination portion 223 determines the absence of abnormality in the rotary machine M. The prescribed threshold th can be suitably set depending on the embodiment of the feature amount CV based on the measurement data sampled from the rotary machine M under a normal condition and the measurement data sampled from the rotary machine M under an abnormal condition.

Next, operations of the present embodiment are described. FIG. 6 is a flowchart describing operations of the rotary machine abnormality detection device in the embodiment.

The rotary machine abnormality detection device AD executes the control processing programs, for example, when a startup switch not illustrated is operated by a user and an operation of the rotary machine M is started. The control processing portion 2 is functionally configured with the control portion 21 and the abnormality detection portion 22, and the abnormality detection portion 22 is functionally configured with the spectrum processing portion 221, the feature amount processing portion 222 (feature amount processing portion 222a in this case), and the abnormality determination portion 223 by executing the control processing programs. The rotary machine abnormality detection device AD then detects abnormality in the rotary machine M by the following operations.

First of all, the vibration measuring portion 1 detects a vibration in the rotary machine M and outputs a measurement result of the vibration to the control processing portion 2.

In FIG. 6, the rotary machine abnormality detection device AD first collects measurement data by the control processing portion 2 (S1). More specifically, in the above-mentioned state, the control portion 21 of the control processing portion 2 samples the measurement result inputted from the vibration measuring portion 1 at prescribed sampling intervals as measurement data and stores the measurement data in the measurement data storage portion 61 of the storage portion 6. In this manner, the measurement result is continuously measured at the sampling intervals and the measurement data composed of a plurality of data acquired in a time series manner are stored in the measurement data storage portion 61.

Next, the spectrum processing portion 221 of the abnormality detection portion 22 in the rotary machine abnormality detection device AD obtains the RMS of the measurement data (or the envelope of the measurement data) from the measurement data including the latest one, which are measured in a preset prescribed time range and stored in the storage portion 6 (the measurement data of the measurement results measured from a newest measurement time point to a time point obtained by tracking back for a length of time corresponding to the prescribed time range), and then obtains the frequency spectrum of the measurement data by applying fast Fourier transform (FFT) to the determined RMS of the measurement data (or the envelope of the measurement data) (S2). It is noted that, as mentioned before, the measurement data may be filtered with the high pass filter 2211 before obtaining the RMS and the envelope.

Next, the feature amount processing portion 222 of the abnormality detection portion 22 in the rotary machine abnormality detection device AD obtains the specific feature amount CV based on the frequency spectrum obtained by the spectrum processing portion 221 (S3). In this case, the feature amount processing portion 222a obtains the feature amount CVa of the first embodiment, that is, the total sum of the fundamental wave component F1 and the n-th harmonic wave components Fn (CVa=$\Sigma$Fi, i=1 to 12, $\Sigma$ represents a summing operation with index i). It is noted that, in consideration of an error in the rotation speed of the rotating body 81, several data preceding and succeeding each of the fundamental wave component F1 and the n-th harmonic wave components Fn may be added to the total sum to make sure that all the fundamental wave component F1 and the n-th harmonic wave components Fn are included.

Next, the abnormality determination portion 223 of the abnormality detection portion 22 in the rotary machine abnormality detection device AD determines the existence of abnormality in the rotary machine M based on the specific feature amount CV obtained by the feature amount processing portion 222 (S4). More specifically, in this case, the abnormality determination portion 223 determines the existence of abnormality in the rotary machine M by determining whether or not the feature amount CVa of the first embodiment obtained by the feature amount processing portion 222a is equal to or higher than the prescribed threshold th. As a result of this determination, when the feature amount CVa of the first embodiment obtained by the feature amount processing portion 222a is equal to or higher than the prescribed threshold th, the abnormality determination portion 223 determines the presence of abnormality in the rotary machine M, while when the feature amount CVa of the first embodiment obtained by the feature amount processing portion 222a is less than the prescribed threshold th, the abnormality determination portion 223 determines the absence of abnormality in the rotary machine M.

Next, the control portion 21 in the rotary machine abnormality detection device AD outputs the determination result in the processing S4 to the output portion 4 (S5).

Next, the control processing portion 2 in the rotary machine abnormality detection device AD determines whether or not the present processing is ended, that is, whether or not an additional abnormality determination is needed (S6). As a result of this determination, the control processing portion 2 ends the present processing when ending (not needed) is confirmed (Yes), while the control processing portion 2 repeats the processing S2 when ending (not needed) is denied (No). It is noted that a wait processing for waiting for a prescribed time may be performed before repeating the processing S2. In this manner, abnormality determination can be performed consecutively at the prescribed time intervals.

As described above, when the frequency VA/MA obtained by dividing the first rotational frequency VA by the first number of teeth MA is represented by the fundamental wave lobe mesh frequency f1 [Hz] and the least common multiple of the first number of teeth MA and the second number of teeth MB is represented by XAB, the rotary machine abnormality detection device AD of the present embodiment, the rotary machine abnormality detection method implemented therein, and the rotary machine M with the device and method used therein obtain, from the frequency spectrum, the fundamental wave component F1 of the fundamental wave lobe mesh frequency f1 and the n-th harmonic wave components Fn of the n-th harmonic wave lobe mesh frequencies fn (n=2 to XAB) with respect to the fundamental wave lobe mesh frequency f1 up to the least common multiple XAB-th harmonic wave. Thus, they can obtain the frequency components F1 to Fn corresponding to all combinations of contacts between the first and second rotating bodies 81-1 and 81-2. Since the rotary machine abnormality detection device, the method thereof, and the rotary machine M determine the existence of contact based on the frequency components F1 to Fn corresponding to all combinations of contacts, they can determine abnormality with higher accuracy.

Further, when the rotary machine abnormality detection device AD, the method thereof, and the rotary machine M comprise the above-mentioned high pass filter 2211 and the spectrum portion 2212, they can eliminate a background noise distributed in a relatively low frequency band and detect abnormality with higher accuracy. In particular, a background noise of compressor is mainly generated by vibration, thus the noise is strongly distributed in a relatively low frequency band, while a signal caused by contact is strongly generated also in a high frequency band. Due to such a difference in characteristics, a performance for detecting the existence of contact can be improved by including the high pass filter 2211.

It is noted that the foregoing has been given in a case where there is one vibration measuring portion 1, however, a plurality of the vibration measuring portions 1 may be used and measurement data measured by each vibration measuring portion 1 may be processed individually.

Further, in the foregoing, the feature amount processing portion 222 comprises the feature amount processing portion 222a that obtains the feature amount CVa of the first embodiment, however, the feature amount processing portion 222 may comprise the feature amount processing portions 222b to 222e for obtaining the feature amounts CVb to CVe of the second to fifth embodiments.

Figure 9A:
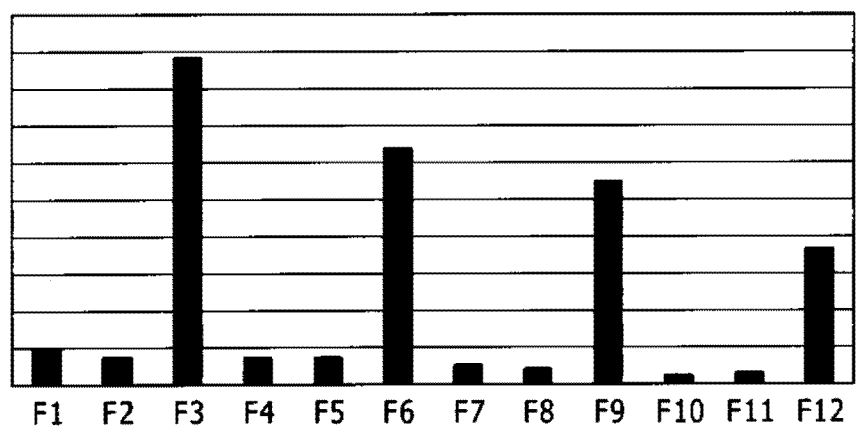
FIGS. 9A-9B are diagrams for explaining a feature amount of a third embodiment.
Figure 9B:
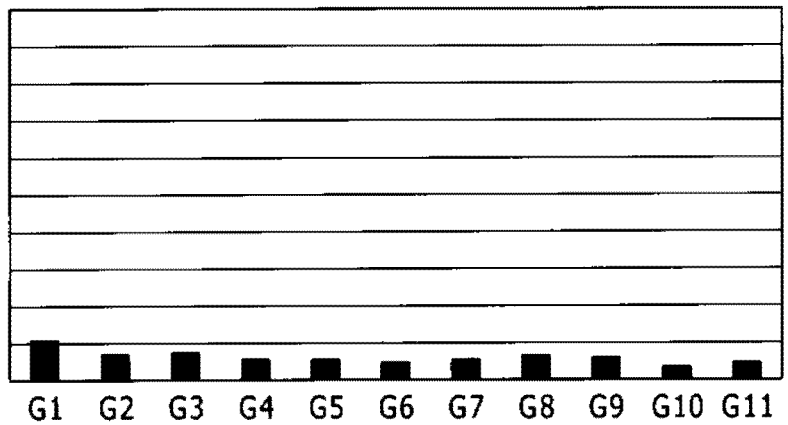
Figure 12:
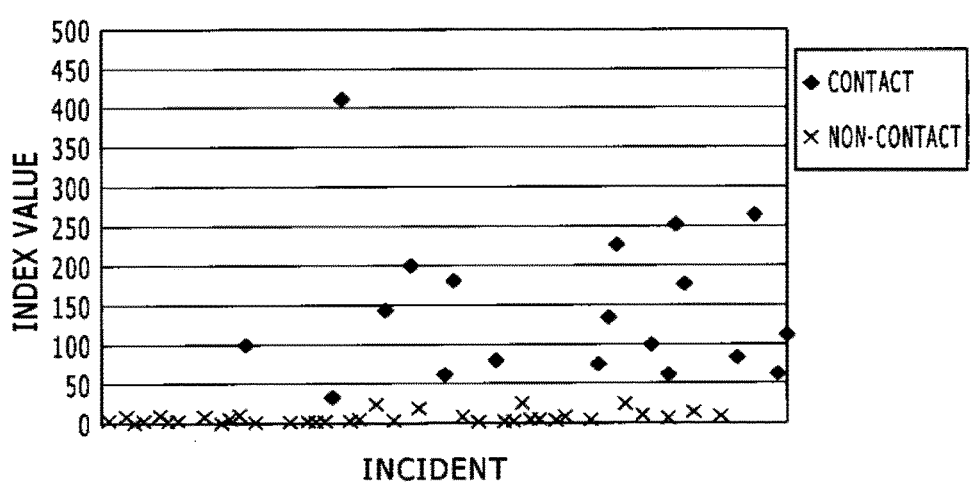
FIG. 12 is a diagram illustrating one example of a determination result of abnormality using a feature amount of a fifth embodiment.

FIG. 7 is a diagram for explaining the feature amount of the second embodiment. The lateral axis of FIG. 7 indicates time while the vertical axis indicates an amount of change. FIG. 8 is a diagram illustrating a temporal change in the frequency spectrum before and after the occurrence of abnormality. FIG. 8A shows the frequency spectrum 10 seconds before the occurrence of contact, FIG. 8B shows the frequency spectrum 5 seconds before the occurrence of contact, FIG. 8C shows the frequency spectrum at the time of the occurrence of contact, and FIG. 8D shows the frequency spectrum 2 seconds after the occurrence of contact. The lateral axes of FIG. 8 indicate frequencies while the vertical axes indicate component values. FIG. 9 is a diagram for explaining the feature amount of the third embodiment. FIG. 9A shows respective components of the fundamental wave lobe mesh frequency f1 and the n-th harmonic wave lobe mesh frequencies fn and FIG. 9B shows the non-harmonic wave components. FIG. 10 is a diagram illustrating one example of model information related to the feature amount of the fourth embodiment. FIG. 11 is a diagram for explaining a procedure for obtaining the model information in FIG. 10. FIG. 11A shows the RMS of the measurement data in a case where contact takes place with one lobe mesh among 12 lobe meshes and FIG. 11B shows a part of results obtained after applying Fourier transform to the RMS. FIG. 12 is a diagram illustrating one example of a determination result of abnormality using the feature amount of the fifth embodiment. The lateral axis of FIG. 12 indicates an incident while the vertical axis indicates the feature amount value (index value).

The feature amount CVb of the second embodiment is first described. The feature amount CVb of the second embodiment is an amount of change of the fundamental wave component F1 and the n-th harmonic wave components Fn, more specifically, an amount of change of the fundamental wave component F1 and the n-th harmonic wave components Fn with respect to a lapse of time. The frequency spectrum changes as shown in FIG. 8 before and after the occurrence of contact as abnormality. Consequently, the amount of change of the fundamental wave component F1 and the n-th harmonic wave components Fn with respect to a lapse of time changes as shown in FIG. 7. More specifically, the frequency spectrum hardly changes as shown in FIGS. 8A and B before the occurrence of contact and, as a result, the amount of change is substantially zero as shown in FIG. 7. When the contact occurs, the frequency spectrum changes as shown in FIG. 8C, and such a change is reflected in the amount of change as shown in FIG. 7. As the contact becomes more prominent, the frequency spectrum changes further as shown in FIG. 8D, and such a change appears as the larger amount of change as shown in FIG. 7. As such, it is considered that the amount of change of the fundamental wave component F1 and the n-th harmonic wave components Fn with respect to a lapse of time can be used as an index for evaluating the existence of abnormality and is thus suitable as one of the specific feature amounts CV.

When such a feature amount CVb of the second embodiment is used, the feature amount processing portion 222 comprises a feature amount processing portion 222b that obtains, from first and second frequency spectra of first and second measurement data measured in first and second periods different from each other, respectively, the fundamental wave components F1 and the n-th harmonic wave components Fn both in the first and second periods, and then obtains an amount of change of the determined fundamental wave components F1 and n-th harmonic wave components Fn in each of the first and second periods as the specific feature amount CVb of the second embodiment. More specifically, the feature amount processing portion 222b obtains a square sum of differences of the determined fundamental wave components F1 and n-th harmonic wave components Fn in each of the first and second periods for each component as the amount of change. It is noted that, when the processing S2 is returned from the processing S6 as described above, the spectrum processing portion 221 consecutively obtains the frequency spectra at different periods, thus it is considered that the spectrum processing portion 221 meets the condition of obtaining the first and second frequency spectra of the first and second measurement data measured in the first and second periods different from each other, respectively.

In more detail, when the fundamental wave component F1 and the n-th harmonic wave components Fn in the current period (one example of the fundamental wave component F1 and the n-th harmonic wave components Fn in the first period) are represented by an Fi_now (1: integer from 1 to n), and average values of each of the fundamental wave components F1 and the n-th harmonic wave components Fn obtained in periods prior to the current period (one example of the fundamental wave component F1 and the n-th harmonic wave components Fn in the second period) are represented by an Fi_past (i: integer from 1 to n), the feature amount processing portion 222b obtains the amount of change, that is, the feature amount CVb of the second embodiment as shown in the following formula 2. It is noted that the periods in which the average values Fi_past are calculated are suitably set according to a change cycle of an operation condition of the rotary machine M as a measuring object.

$$CVb = \Sigma (Fi\_now - Fi\_past)^2 \qquad (2)$$

Further, the output of the vibration measuring portion 1 relatively significantly changes as described above before and after the point of time when contact occurs as abnormality, however, the output of the vibration measuring portion 1 sometimes gradually changes without contact, for example, when the operation condition of the rotary machine M changes. The amount of change CVb of the fundamental wave components F1 and the n-th harmonic wave components Fn in each of the first and second periods, especially the square sum CVb of differences of these components shown in the formula 2, indicates a change of periodicity of the contact and thus has characteristic of becoming relatively large at the points of time when the contact occurs from a non-contact state and when a contact state itself changes. Therefore, the rotary machine abnormality detection device AD for obtaining the feature amount CVb of the second embodiment, the method implemented therein, and the rotary machine M with the device and method used therein obtain such an amount of change CVb as the specific feature amount CV and thus can detect them, with higher accuracy, the points of time when the contact occurs from a non-contact state and when a contact state itself changes. Further, the amount of change does not become large even when a background noise is relatively high unless there is a change in that trend, thus the rotary machine abnormality detection device AD, the method thereof, and the rotary machine M can reduce the frequency of the misdetection.

Next, the feature amount CVc of the third embodiment is described. The feature amount CVc of the third embodiment is based on not only the fundamental wave component F1 and the n-th harmonic wave components Fn, but also non-harmonic wave components G of specific frequencies g each residing between frequencies that are adjacent to each other, the frequencies being composed of the fundamental wave lobe mesh frequency f1 and the n-th harmonic wave lobe mesh frequencies fn (n=2 to XAB).

When such a feature amount CVc of the third embodiment is used, the feature amount processing portion 222 comprises a feature amount processing portion 222c that further obtains, from the frequency spectrum obtained by the spectrum processing portion 221, the non-harmonic wave components G of the specific frequencies g each residing between frequencies that are adjacent to each other, the frequencies being composed of the fundamental wave lobe mesh frequency f1 and the n-th harmonic wave lobe mesh frequencies fn (n=2 to XAB) up to the least common multiple XAB-th harmonic wave, and then obtains the feature amount CVc of the third embodiment based on the determined fundamental wave component F1, n-th harmonic wave components Fn, and non-harmonic wave components G. More specifically, as shown in FIG. 9B, the non-harmonic wave component G is a component of frequency at a center between the adjacent frequencies (Gk=(Fk+Fk+1)/2, k: integer from 1 to XAB−1) from the viewpoint of obtaining a frequency farthest from the fundamental wave lobe mesh frequency f1 and the n-th harmonic wave lobe mesh frequencies fn.

In more detail, as shown in the following formula 3, the feature amount processing portion 222c further obtains, from the frequency spectrum obtained by the spectrum processing portion 221, the non-harmonic wave components Gk (k: integer from 1 to XAB−1) of the specific frequencies gk each residing at the center between frequencies that are adjacent to each other, the frequencies being composed of the fundamental wave lobe mesh frequency f1 and the n-th harmonic wave lobe mesh frequencies fn (n=2 to XAB) up to the least common multiple XAB-th harmonic wave, and then obtains a total sum ratio of component provided by dividing a total sum of the determined fundamental wave component F1 and n-th harmonic wave components Fn (see FIG. 9A) by a total sum of the determined non-harmonic wave components Gk (see FIG. 9B) as the feature amount CVc of the third embodiment. It is noted that the existence of abnormality may be determined by the total sum of the non-harmonic wave components Gk, however, this method is weak to changes in a level of background noise. Thus, in the present embodiment, the existence of abnormality is determined by the total sum ratio of component. In this manner, it is determined that the feature amount CVc of the third embodiment (equal to the total sum ratio of component) substantially matches a signal caused by the rotating body 81.

$$CVc = \text{total sum ratio of component} = (\text{total sum of fundamental wave component } F1 \text{ and n-th harmonic wave components})/(\text{total sum of non-harmonic wave components } Gk) = (\Sigma Fi)/(\Sigma Gk) \quad (3)$$

The output of the vibration measuring portion 1 such as the AE sensor is sometimes superposed with an single-shot electrical noise. The rotary machine abnormality detection device AD obtaining the feature amount CVc of the third embodiment, the method implemented therein, and the rotary machine M with the device and method used therein obtain the specific feature amount CV by further considering the non-harmonic wave components G and thus can avoid influence of superposition of such a single-shot electrical noise and the like on detection of abnormality, thereby enabling to reduce a noise having no periodicity.

Next, the feature amount CVd of the fourth embodiment is described. The feature amount CVd of the fourth embodiment is a maximum value of matching degrees obtained by comparing the measured components with a plurality of models generated in advance for each condition of abnormality in the first and second rotating bodies 81-1 and 81-2. The model is composed of model values of the fundamental wave component F1 and the n-th harmonic wave components Fn corresponding to each condition of abnormality. The matching degree is a value representing a degree of matching between the fundamental wave component F1 and the n-th harmonic wave components Fn obtained from the frequency spectrum of the measurement data measured by the vibration measuring portion 1, and the model.

When such a feature amount CVd of the fourth embodiment is used, as shown in broken lines in FIG. 1, the storage portion 6 of the rotary machine abnormality detection device AD further comprises a model information storage portion 62 for storing in advance the model values of the fundamental wave component F1 and the n-th harmonic wave components Fn corresponding to each condition of abnormality as model information. The feature amount processing portion 222 then comprises a feature amount processing portion 222d that obtains the matching degree between the fundamental wave component F1 and the n-th harmonic wave components Fn obtained from the frequency spectrum of the measurement data measured by the vibration measuring portion 1, and the model information (the model) for each condition of abnormality, and then obtains the maximum matching degree among the matching degrees obtained for each condition of abnormality as the feature amount CVd of the fourth embodiment.

More specifically, the model information is stored in the model information storage portion 62 in a table format. The model information table MT comprises, for example, as shown in FIG. 10, a contact model field 621 for registering a model name and a coefficient field 622 for registering the model values of the model expressed by the model name registered in the contact model field 621, and also comprises a record for each model name. The coefficient field 622 comprises subfields, for registering the model values, of which the number is the same as the least common multiple XAB of the first number of teeth MA and the second number of teeth MB. In the example shown in FIG. 10, as described above, the first number of teeth MA of the first rotating body 81-1 are 3 units and the second number of teeth MB of the second rotating body 81-2 are 4 units, thus the coefficient field 622 comprises 12 subfields 622-1 to 622-12 for registering the model values ai (i=1 to 12). The model information table MT then registers 6 models modeling abnormality in which a contact is periodically generated, and includes the following records: a record of first line registering the model values ai of one lobe mesh contact among 12 lobe meshes, representing abnormality in which the contact occurs with 1 lobe mesh among these 12 combinations; a record of second line registering the model values ai of two lobe mesh contacts among 12 lobe meshes, representing abnormality in which the contact occurs with 2 lobe meshes among the 12 combinations; a record of third line registering the model values ai of three lobe mesh contacts among 12 lobe meshes, representing abnormality in which the contact occurs with 3 lobe meshes among the 12 combinations; a record of fourth line registering the model values ai of four lobe mesh contacts among 12 lobe meshes, representing abnormality in which the contact occurs with 4 lobe meshes among the 12 combinations; a record of fifth line registering the model values ai of six lobe mesh contacts among 12 lobe meshes, representing abnormality in which the contact occurs with 6 lobe meshes among the 12 combinations; and a record of sixth line registering the model value ai of twelve lobe mesh contacts among 12 lobe meshes, representing abnormality in which the contact occurs with 12 lobe meshes among the 12 combinations. The model value ai of the models can be obtained in advance, for example, by measuring a plurality of samples form the rotary machine M actually with abnormality of contact developed thereon and performing a statistical processing of the plurality of samples to obtain the fundamental wave component F1 and the n-th harmonic wave components Fn. For example, in the case of one lobe mesh contact among 12 lobe meshes, the RMS is obtained from the measurement data of the samples to produce a result shown in FIG. 11A, and the RMS is applied to fast Fourier transform (FFT) to produce a result shown in FIG. 11B (FIG. 11B shows a part of the result of fast Fourier transform). Peak values of fast Fourier transform shown in FIG. 11B represent the model values ai of the model of the one lobe mesh contact among 12 lobe meshes. It is noted that the model values ai are normalized for making a total sum of the model values ai become 1 ($\Sigma ai=1$).

The feature amount processing portion 222d, for example, multiplies each value Fi of the fundamental wave component F1 and the n-th harmonic wave components Fn obtained from the frequency spectrum of the measurement data measured by the vibration measuring portion 1, by the corresponding model value ai for each model (Fi×ai), and then obtains their total sum Sm (Sm=$\Sigma$(Fi×ai), i=1 to 12, $\Sigma$ represents a summing operation with index i, m=1 to 6 in this example). The feature amount processing portion 222d obtains a total sum SS by summing the total sum Sm obtained for each model (SS=$\Sigma$Sm, m=1 to 6, $\Sigma$ represents a summing operation with index m), and then divides (normalizes) the total sum Sm of the model by the determined total sum SS for each model (Sm/SS, m=1 to 6). These division results represent the matching degrees and such a calculation method can eliminate influence of absolute values in a component distribution of the fundamental wave component F1 and n-th harmonic wave components Fn. Finally, the feature amount processing portion 222d obtains the maximum value of the division results (matching degrees) obtained for each model as the feature amount CVd of the fourth embodiment.

The rotary machine abnormality detection device AD obtaining the feature amount CVd of the fourth embodiment, the method implemented therein, and the rotary machine M with the device and method used therein obtain the maximum matching degree among the matching degrees obtained for each condition of abnormality (each condition of contact in the above case) as the specific feature amount and thus can discriminate abnormality caused by, for example, contact and the like from an electrical pulse noise and a single-shot noise having a relatively large amplitude, cause by an impact from the outside, thereby enabling to detect abnormality with higher accuracy.

It is noted that when the feature amount CVd of the fourth embodiment is used, the abnormality determination portion 223 preferably determines that the rotary machine M has abnormality in the condition having the maximum matching degree among the matching degrees obtained, for each condition of abnormality, by a feature amount processing portion 222d. For example, the matching degree of the two lobe mesh contacts among 12 lobe meshes is the maximum matching degree among the matching degrees of the one lobe mesh contact among 12 lobe meshes, the two lobe mesh contacts among 12 lobe meshes, the three lobe mesh contacts among 12 lobe meshes, the four lobe mesh contacts among 12 lobe meshes, the six lobe mesh contacts among 12 lobe meshes, and the twelve lobe mesh contacts among 12 lobe meshes, the abnormality determination portion 223 determines the presence of abnormality of the two lobe mesh contacts among 12 lobe meshes. According to this, the condition of abnormality can be detected.

Next, the feature amount CVe of the fifth embodiment is described. The feature amount CVe of the fifth embodiment is based on a plurality of the following values described above: the total sum, the amount of change, the total sum ratio of component, and the maximum matching degree.

When such a feature amount CVe of the fifth embodiment is used, the feature amount processing portion 222 comprises a feature amount processing portion 222e that performs a plurality of processings among the total sum calculation processing, the amount of change calculation processing, the total sum ratio of component calculation processing, and the maximum matching degree calculation processing, and obtains the feature amount CVe of the fifth embodiment based on processing results of the plurality of processings that have been performed. The total sum calculation processing, as described above, obtains the total sum CVa of the fundamental wave component F1 and the n-th harmonic wave components Fn. The amount of change calculation processing, as described above, obtains the fundamental wave components F1 and the n-th harmonic wave components Fn from both the first and second frequency spectra measured in the first and second periods, respectively, and then obtains the amount of change CVb of the determined fundamental wave components F1 and n-th harmonic wave components Fn in each of the first and second periods. The total sum ratio of component calculation processing, as described above, further obtains, from the frequency spectrum, the non-harmonic wave components Gi (i: integer in a range of from 1 to n–1) of the specific frequencies gi each residing between frequencies that are adjacent to each other, the frequencies being composed of the fundamental wave lobe mesh frequency f1 and the n-th harmonic wave lobe mesh frequencies fn (n=2 to XAB) up to the least common multiple XAB-th harmonic wave, and then obtains the total sum ratio of component CVc by dividing the total sum of the determined fundamental wave component F1 and n-th harmonic wave components Fn by the total sum of the determined non-harmonic wave components Gi. The maximum matching degree calculation processing obtains the matching degree expressing a degree of matching between the determined fundamental wave component F1 and n-th harmonic wave components Fn, and the model information for each condition of abnormality, and then obtains the maximum matching degree CVd among the matching degrees obtained for every condition of abnormality.

More specifically, the feature amount processing portion 222e obtains the feature amount CVe of the fifth embodiment, for example, by the following formula 4. It is to be noted that the asterisk "*" as used herein means multiplication.

$$CVe = p1*CVa + p2*CVb + p3*CVc + p4*CVd \quad (4)$$

Further, the feature amount processing portion 222e obtains the feature amount CVe of the fifth embodiment, for example, by the following formula 5.

$$CVe = CVa^{p1} * CVb^{p2} * CVc^{p3} * CVd^{p4} \quad (5)$$

Further, parameters p1 to p4 (real number) in the formula 4 and the formula 5 can be obtained by a method such as, for example, a multiple regression analysis as a value capable of appropriately discriminating the existence of contact by using the total sum CVa, the amount of change CVb, the total sum ratio of component CVc, and the maximum matching degree CVd, all obtained from the measurement data actually measured by the vibration measuring portion 1 when the contact occurs, and the total sum CVa, the amount of change CVb, the total sum ratio of component CVc, and the maximum matching degree CVd, all obtained from the measurement data actually measured by the vibration measuring portion 1 without the contact.

As an example, FIG. 12 shows a result of the feature amounts CVe(♦) obtained by the formula 5 using the measurement data actually measured by the vibration measuring portion 1 when the contact occurs, and the feature amounts CVe(X) obtained by the formula 5 using the measurement data actually measured by the vibration measuring portion 1 without contact. As shown in FIG. 12, a distribution of the feature amounts CVe(♦) with contact and a distribution of the feature amounts CVe(X) without contact are substantially distinguishable, thus the feature amount CVe of the formula 5 can be used to discriminate the existence of abnormality caused by contact.

The rotary machine abnormality detection device AD obtaining the feature amount CVe of the fifth embodiment, the method implemented therein, and the rotary machine M with the device and method used therein obtain the feature amount CVe of the fifth embodiment based on the processing results obtained by performing the plurality of processings and thus can detect abnormality with higher accuracy.

It is noted that the above-mentioned formula 4 and formula 5 use all of the four values, the total sum CVa, the amount of change CVb, the total sum ratio of component CVc, and the maximum matching degree CVd. However, the formula 4 and formula 5 may use a combination of any two of the total sum CVa, the amount of change CVb, the total sum ratio of component CVc, and the maximum matching degree CVd. Further, the formula 4 and formula 5 may use a combination of any three of the total sum CVa, the amount of change CVb, the total sum ratio of component CVc, and the maximum matching degree CVd. The total sum CVa, the amount of change CVb, the total sum ratio of component CVc, and the maximum matching degree CVd are, as described above, suitable values for extracting the signal indicating abnormality of the rotating body 81 from the measurement data of the vibration measuring portion 1 or eliminating various noises from the measurement data of the vibration measuring portion 1. Thus, the formula 4 and formula 5 preferably use a suitable combination of any two of the total sum CVa, the amount of change CVb, the total sum ratio of component CVc, and the maximum matching degree CVd according to the above purposes, and further the formula 4 and formula 5 preferably use a suitable combination of any three of the total sum CVa, the amount of change CVb, the total sum ratio of component CVc, and the maximum matching degree CVd according to the above purposes.

Although the present invention has been appropriately and fully described in the above by way of the embodiments with reference to the drawings in order to represent the present invention, it is to be appreciated that those skilled in the art can easily change and/or modify the foregoing embodiments. Therefore, as far as such modifications or changes to be implemented by those skilled in the art do not depart from the scope of claims hereinafter defined, they should be construed as being included therein.

What is claimed is:

1. A rotary machine abnormality detection device for detecting abnormality of a rotary machine having at least first and second rotating bodies, which rotate axially with respect to a corresponding prescribed axis while being engaged with each other by having a prescribed space under a normal condition, the rotary machine abnormality detection device comprising:
    a sensor configured to measure a vibration caused by at least one of the first and second rotating bodies; and
    circuitry configured to
        obtain a frequency spectrum of measurement data measured by the sensor,
        obtain a specific feature amount corresponding to a specific frequency component based on the frequency spectrum obtained, and
        determine existence of abnormality in the rotary machine based on the feature amount obtained, wherein,
    when a first number of teeth and a first rotational frequency of the first rotating body are represented by MA [unit] and VA [Hz], respectively, a second number of teeth of the second rotating body is represented by MB [unit], the least common multiple of the first number of teeth MA and the second number of teeth MB is represented by XAB, a fundamental wave lobe mesh frequency VA/MA obtained by dividing the first rotational frequency VA by the first number of teeth MA is represented by f1 [Hz], and n-th harmonic wave lobe mesh frequencies (n: integer of 2) with respect to the fundamental wave lobe mesh frequency f1 are represented by fn [Hz], the circuitry is configured to obtain, from the frequency spectrum, a fundamental wave component F1 of the fundamental wave lobe mesh frequency f1 and n-th harmonic wave components Fn of the n-th harmonic wave lobe mesh frequencies fn (n=2 to XAB) up to least common multiple XAB-th harmonic wave, and then obtain the specific feature amount based on the obtained fundamental wave component F1 and n-th harmonic wave components Fn.

2. The rotary machine abnormality detection device according to claim 1, wherein:
    the circuitry is configured to
        obtain first and second frequency spectra of first and second measurement data measured in first and second periods different from each other, respectively, and
        obtain the fundamental wave components F1 and the n-th harmonic wave components Fn from both the first and second frequency spectra measured in the first and second periods, respectively, and then obtain an amount of change of the determined fundamental wave components F1 and n-th harmonic wave components Fn in each of the first and second periods as the specific feature amount.

3. The rotary machine abnormality detection device according to claim 2, wherein the circuitry is configured to obtain a square sum of differences of the determined fundamental wave components F1 and n-th harmonic wave components Fn in each of the first and second periods for each component as the amount of change.

4. The rotary machine abnormality detection device according to claim 1, wherein the circuitry is configured to obtain, from the frequency spectrum, non-harmonic wave components G of specific frequencies g each residing between frequencies that are adjacent to each other, the frequencies being composed of the fundamental wave lobe mesh frequency f1 and the n-th harmonic wave lobe mesh frequencies fn (n=2 to XAB) up to the least common multiple XAB-th harmonic wave, and then obtain the specific feature amount based on the determined fundamental wave component F1, n-th harmonic wave components Fn, and non-harmonic wave components G.

5. The rotary machine abnormality detection device according to claim 1, further comprising a model information memory configured to store in advance, as model information, model values of the fundamental wave component F1 and the n-th harmonic wave components Fn corresponding to each condition of abnormality occurring in the first and second rotating bodies, wherein the circuitry is configured to obtain a matching degree representing a degree of matching between the determined fundamental wave component F1 and n-th harmonic wave components Fn, and the model information for each condition of abnormality, and then obtain a maximum matching degree among the matching degrees obtained for each condition of abnormality as the specific feature amount.

6. The rotary machine abnormality detection device according to claim 5, wherein the circuitry is configured to determine presence of abnormality in the rotary machine in the condition having the maximum matching degree among the matching degrees obtained, for each condition of abnormality.

7. The rotary machine abnormality detection device according to claim 1, further comprising a model information memory configured to store in advance, as model information, model values of the fundamental wave component FI and the n-th harmonic wave components Fn corresponding to each condition of abnormality occurring in the first and second rotating bodies, wherein the circuitry is configured to:

obtain first and second frequency spectra of first and second measurement data measured in first and second periods different from each other, respectively, perform a plurality of processings among:
a total sum calculation processing for obtaining a total sum of the determined fundamental wave component F1 and n-th harmonic wave components Fn;
an amount of change calculation processing for obtaining the fundamental wave components F1 and the n-th harmonic wave components Fn from both the first and second frequency spectra measured in the first and second periods, respectively, and then obtaining an amount of change of the determined fundamental wave components F1 and n-th harmonic wave components Fn in each of the first and second periods;
a total sum ratio of component calculation processing for further obtaining, from the frequency spectrum, non-harmonic wave components Gi (i: integer from 1 to n−1) of specific frequencies gi each residing between frequencies that are adjacent to each other, the frequencies being composed of the fundamental wave lobe mesh frequency f1 and the n-th harmonic wave lobe mesh frequencies fn (n=2 to XAB) up to the least common multiple XAB-th harmonic wave, and then obtaining a total sum ratio of component by dividing a total sum of the determined fundamental wave component F1 and n-th harmonic wave components Fn by a total sum of the determined non-harmonic wave components Gi; and a maximum matching degree calculation processing for obtaining a matching degree representing a degree of matching between the determined fundamental wave component F1 and n-th harmonic wave components Fn, and the model information for each condition of abnormality, and then obtaining a maximum matching degree among the matching degrees obtained for each condition of abnormality, and obtain the specific feature amount based on processing results of the plurality of processings that have been performed.

8. The rotary machine abnormality detection device according to claim 1, wherein the circuitry is configured to apply a high pass filter to eliminate a noise and obtain a frequency spectrum of measurement data, the measurement data being measured by the sensor and having passed through the high pass filter.

9. A rotary machine comprising the rotary machine abnormality detection device according to claim 1.

10. A rotary machine abnormality detection method for detecting abnormality in a rotary machine comprising first and second rotating bodies, which rotate axially with respect to a corresponding prescribed axis while being engaged with each other by having a prescribed space under a normal condition, the rotary machine abnormality detection method comprising:

measuring a vibration caused by at least one of the first and second rotating bodies;

spectrum processing obtaining a frequency spectrum of measurement data measured in the measuring;

feature amount obtaining a specific feature amount corresponding to a specific frequency component based on the frequency spectrum obtained in the spectrum processing obtaining; and determining existence of abnormality in the rotary machine based on the feature amount obtained in the feature amount obtaining, wherein, when a first number of teeth and a first rotational frequency of the first rotating body are represented by MA [unit] and VA [Hz], respectively, a second number of teeth of the second rotating body is represented by MB [unit], the least common multiple of the first number of teeth MA and the second number of teeth MB is represented by XAB, a fundamental wave lobe mesh frequency VA/MA provided by dividing the first rotational frequency VA by the first number of teeth MA is represented by f1 [Hz], and n-th harmonic wave lobe mesh frequencies (n: integer of ≥2) with respect to the fundamental wave lobe mesh frequency f1 are represented by fn [Hz], the feature amount obtaining obtains, from the frequency spectrum, a fundamental wave component F1 of the fundamental wave lobe mesh frequency f1 and n-th harmonic wave components Fn of the n-th harmonic wave lobe mesh frequencies fn (n=2 to XAB) up to least common multiple XAB-th harmonic wave, and then obtains the specific feature amount based on the obtained fundamental wave component F1 and n-th harmonic wave components Fn.

* * * * *